United States Patent
De Ridder et al.

(10) Patent No.: US 10,984,574 B1
(45) Date of Patent: Apr. 20, 2021

(54) GENERATING ANIMATIONS IN AN AUGMENTED REALITY ENVIRONMENT

(71) Applicant: Adobe Inc., San Jose, CA (US)

(72) Inventors: Yaniv De Ridder, San Francisco, CA (US); Stefano Corazza, Greenbrae, CA (US); Lee Brimelow, San Francisco, CA (US); Erwan Maigret, Ceyreste (FR); David Montero, San Francisco, CA (US)

(73) Assignee: Adobe Inc., San Jose, CA (US)

( * ) Notice: Subject to any disclaimer, the term of this patent is extended or adjusted under 35 U.S.C. 154(b) by 0 days.

(21) Appl. No.: 16/692,521

(22) Filed: Nov. 22, 2019

(51) Int. Cl.
| | |
|---|---|
| *G06T 19/00* | (2011.01) |
| *G06T 13/20* | (2011.01) |
| *G06F 3/0484* | (2013.01) |
| *G06F 3/0488* | (2013.01) |
| *G06F 3/0481* | (2013.01) |

(52) U.S. Cl.
CPC ............ *G06T 13/20* (2013.01); *G06T 19/006* (2013.01); *G06F 3/0488* (2013.01); *G06F 3/04815* (2013.01); *G06F 3/04845* (2013.01); *G06T 2200/24* (2013.01)

(58) Field of Classification Search
None
See application file for complete search history.

(56) References Cited

U.S. PATENT DOCUMENTS

2012/0256928 A1 * 10/2012 Chiculita ................ G06T 13/20 345/473
2020/0005532 A1 * 1/2020 Kovar ..................... G06T 13/20

OTHER PUBLICATIONS

Kato et la., Virtual Object Manipulation on a Table-Top AR Environment, Dec. 2000, IEEE, p. 111-119 (Year: 2000).*

* cited by examiner

*Primary Examiner* — Robert J Craddock
(74) *Attorney, Agent, or Firm* — Kilpatrick Townsend & Stockton LLP

(57) ABSTRACT

The present disclosure relates to an AR animation generation system identifies an animation profile for animating the virtual object displayed in an augmented reality (AR) scene. The AR animation generation system creates a link between the virtual object and the mobile computing system based upon a position of the virtual object within the AR scene and a position of a mobile device in a real-world environment. The link enables determining for each position of the mobile device in the real-world environment, a corresponding position for the virtual object in the AR scene. The AR animation generation system animates the virtual object using the mobile device by detecting a change in position in the real-world environment of the mobile computing system from a first position to a second position and using the link to determine a change in position for the virtual object in the AR scene from a first position to a second position, The AR animation generation system updates the AR scene to display the virtual object in the second position in the AR scene.

20 Claims, 8 Drawing Sheets

GENERATING ANIMATIONS IN AN AUGMENTED REALITY ENVIRONMENT

TECHNICAL FIELD

This disclosure generally relates to generating animations. More specifically, but not by way of limitation, this disclosure describes techniques for animating a virtual object displayed in an augmented reality (AR) environment.

BACKGROUND

Generating digital animations typically requires knowledge of programming languages, animation programs, animation toolkits and/or their application programming interfaces (APIs), etc. Due to the complexity of these languages/programs/toolkits, the generation or creation of animations is restricted to experienced three-dimensional ("3-D") animators and outside the scope of non-technical users. This is especially true for generating animations of a good or acceptable quality. The advent of augmented reality (AR) environments has opened up new environments for consuming 3-D animations. However, the task of creating animations in these environments is even more complicated due to the technical complexities added on by the AR environment.

SUMMARY

The present disclosure describes techniques for animating a virtual object displayed in an augmented reality (AR) environment. Different animation techniques or modalities are described for animating a virtual object in an AR scene including, but not limited to: (1) animating the virtual object by manipulating a physical mobile computing system that is used to display the AR scene, where the manipulating includes changing the position and/or orientation of the physical mobile computing system, (2) animating the virtual object by interacting with the virtual object displayed in the AR scene using a selection device, for example, such a finger or stylus on a touchscreen displaying the AR scene, using a mouse, and the like, or (3) animating the virtual object using a combination of (1) and (2), (i.e., by manipulating the physical mobile computing system that is used to display the AR scene) in combination with interacting with the virtual object displayed in the AR scene using a selection device.

In certain embodiments, for a virtual object being animated, the user or animator can select an animation profile to be used for animating the virtual object. While the user is animating the virtual object using one of the animation techniques described in this disclosure, the animation profile selected for that virtual object is used to modify the behavior of the virtual object during the animation such that the resultant animation is more realistic and of a good quality.

In certain embodiments, an AR animation generation system identifies an animation profile for animating the virtual object displayed in an augmented reality (AR) scene. The AR animation generation system creates a link between the virtual object and the mobile computing system based upon a position of the virtual object within the AR scene and a position of a mobile device in a real-world environment. The link enables determining for each position of the mobile device in the real-world environment, a corresponding position for the virtual object in the AR scene. The AR animation generation system animates the virtual object using the mobile device by detecting a change in position in the real-world environment of the mobile computing system from a first position to a second position and using the link to determine a change in position for the virtual object in the AR scene from a first position to a second position, The AR animation generation system updates the AR scene to display the virtual object in the second position in the AR scene.

These illustrative embodiments are mentioned not to limit or define the disclosure, but to provide examples to aid understanding thereof. The foregoing, together with other features and embodiments, will become more apparent upon referring to the following specification, claims, and accompanying drawings.

BRIEF DESCRIPTION OF THE DRAWINGS

Features, embodiments, and advantages of the present disclosure are better understood when the following Detailed Description is read with reference to the accompanying drawings.

DETAILED DESCRIPTION

Figure 1:
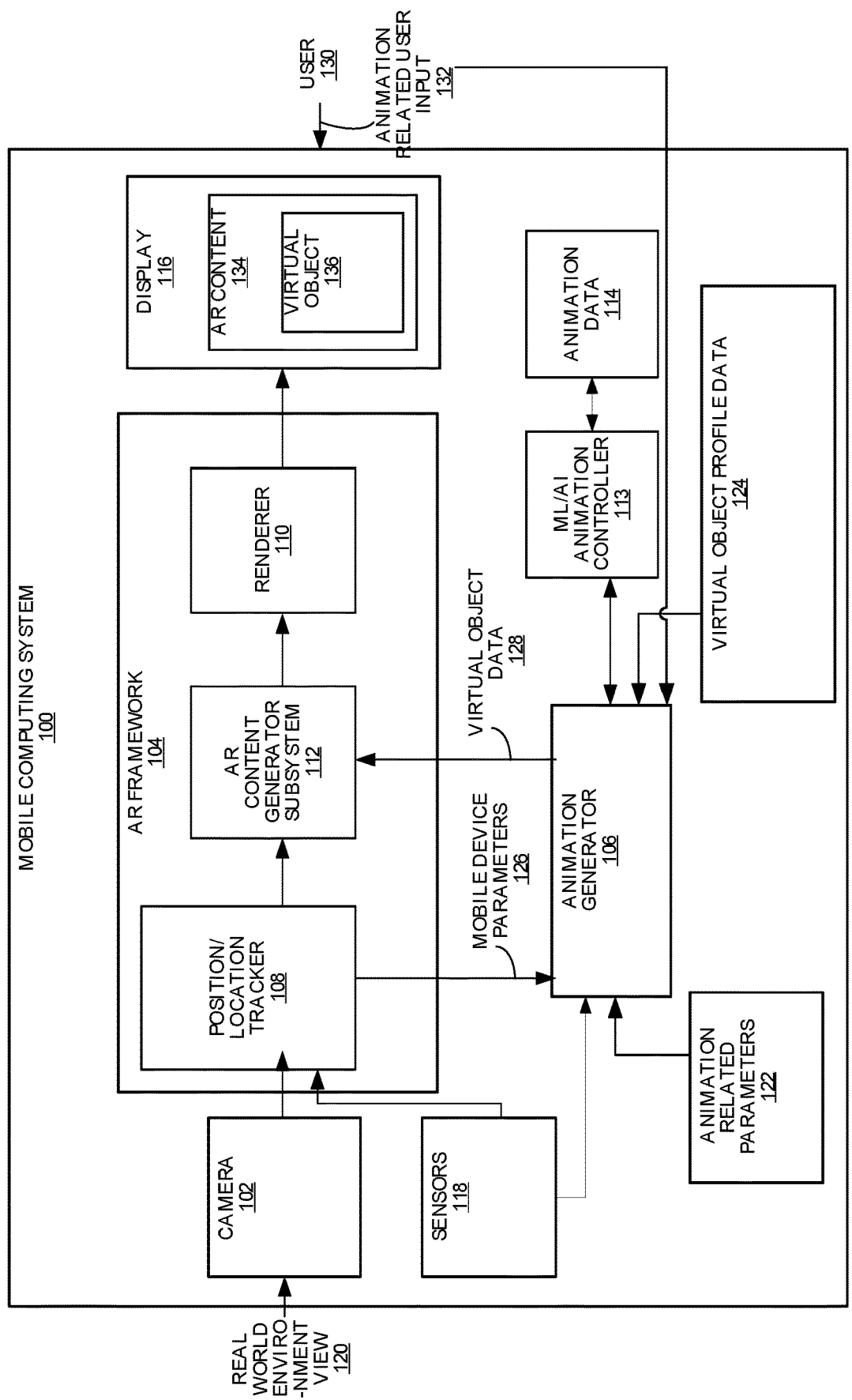
FIG. 1 depicts an example of a system for generating animation using augmented reality, according to certain embodiments.

In the following description, for the purposes of explanation, specific details are set forth in order to provide a thorough understanding of certain inventive embodiments. However, it will be apparent that various embodiments may be practiced without these specific details. The figures and description are not intended to be restrictive. The word "example" is used herein to mean "serving as an example, instance, or illustration." Any embodiment or design described herein as "an example" is not necessarily to be construed as preferred or advantageous over other embodiments or designs. Various embodiments are described herein, including methods, systems, non-transitory computer-readable storage media storing programs, code, or instructions executable by one or more processors, and the like.

The present disclosure describes techniques for animating a virtual object displayed in an augmented reality (AR) environment. Different animation techniques or modalities are described for animating a virtual object in an AR scene including, but not limited to: (1) animating the virtual object by manipulating a physical mobile computing system that is used to display the AR scene, where the manipulating includes changing the position and/or orientation of the physical mobile computing system, (2) animating the virtual object by interacting with the virtual object displayed in the AR scene using a selection device, for example, such a finger or stylus on a touchscreen displaying the AR scene, using a mouse, and the like, or (3) animating the virtual object using a combination (1) and (2), (i.e., by manipulating the physical mobile computing system that is used to display the AR scene) in combination with interacting with the virtual object displayed in the AR scene using a selection device.

In certain embodiments, for a virtual object being animated, the user or animator can select an animation profile to be used for animating the virtual object. Different animation profiles may be provided for different types of virtual objects to be animated and the user can select a particular animation profile for the virtual object being animated. For example, a first animation profile may be selected for animating an automobile, a second animation profile may be selected for animating a helicopter, a third animation profile may be selected for animating an airplane, a fourth animation profile may be selected for animating a human, and the like. While the user is animating the virtual object using one of the animation techniques, the selected animation profile is used to modify the behavior of the virtual object during the animation such that the resultant animation is more realistic and of a good quality.

The use of animation profiles in conjunction with the animation techniques simplify the overall process of animating a virtual object in an AR scene such that even a non-technical user having no programming skills can create and generate realistic looking high quality animations in a simplistic and intuitive manner. The technical challenge of mapping coordinate frames of an animation to a real world environment can make realistic animating difficult. The techniques described herein reduce the complexities inherent in conventional animation processes/techniques. For example, the animator uses a mobile device that presents an AR scene including virtual objects for animation and real world content. The mobile device determines a starting location of the virtual object in the AR scene (e.g., ($X_1$, $Y_1$, $Z_1$) and a starting location of the mobile device and computes a correspondence between the respective starting positions. When an animator selects an animation mode, the mobile device associates the movement or motions to animation parameters (i.e., positions, accelerations, interaction with surfaces) for the virtual object being animated. The mobile device captures motions and iteratively computes the corresponding new positions of the virtual object by using the correspondence between the respective starting positions. The mobile device displays the new position of the virtual object on a screen. Applying the techniques described in this disclosure allows a seamless transition between the real world coordinates and the AR scene coordinates during the animation generation process. Additionally, using virtual object profiles that constrain the animation achieves more realistic animations by constraining movements or motions of the virtual object to a set of parameters that simulate limitations of movement for real world objects.

Augmented Reality ("AR") refers to a set of technologies that display real-world content and digital or virtual content simultaneously. AR techniques are used to generate AR content, where the AR content presents a composite view in which real-world content is displayed along with virtual content. For example, the AR content may include one or more scenes in which virtual content (e.g., a computer-generated virtual object) is superimposed or overlaid on real-world content (e.g., a view of the real-word environment corresponding to an image or a video stream captured by a camera). The view of the real-world environment may, for example, be a view of the real-world environment as captured by the optics of a mobile computing system such as by a camera of a smartphone. AR content or an AR scene may thus include an image or video of the real-world environment with one or more virtual objects superimposed over the image or video feed.

For purposes of this disclosure, the term "position" of an object is intended to refer to a location of the object and/or an orientation of the object. The location of the object is indicated by coordinates within a coordinate system, such as by two coordinates (e.g., (X, Y) coordinates) in a 2-dimensional (2-D) coordinate system, by three coordinates (e.g., (X, Y, Z)) coordinates) in a 3-dimensional (3-D) coordinate system, and the like. The orientation of the object is indicated by the pitch, roll, or yaw angles associated with the object. For purposes of this application, a change in the position of an object can include a change only in the location of the object without a change in the orientation of the object, a change only in the orientation of the object without a change in the location of the object, or a change both in the location and orientation of the object. For example, a change in the position of a virtual object in an AR scene can include a change only in the location of the virtual object within the AR scene without a change in the orientation of the virtual object, a change only in the orientation of the virtual object in the AR scene without a change in the location of the virtual object in the AR scene, or a change both in the location and orientation of the virtual object in the AR scene. For example, a change in the position of a physical object (e.g., a mobile computing system) in the real-world environment can include a change only in the location of the physical object within the real-world environment without a change in the orientation of the physical object, a change only in the orientation of the physical object in the real-world environment without a change in the location of the physical object, or a change both in the location and orientation of the physical object in the real-world environment.

This disclosure describes an AR animation generation system, which in conjunction with an AR framework, enables a user to create animations of one or more virtual objects displayed in one or more AR scenes. Via a graphical user interface (GUI) provided by the AR animation generation system, a user or animator can select a particular virtual object to be animated from one or more virtual object displayed in an AR scene displayed by a mobile computing system. The user can also select an animation profile to be used for animating the virtual object. The user can then signal the start of the animation (e.g., by selecting a "record" button), which triggers recording of the animation. The animation and the recording continues until a signal is received from the user to stop or end the animation.

In certain embodiments, upon receiving a signal from the user to start the generation of the animation, the AR animation generation system determines a first position of the mobile computing system in a real-world coordinate system and also determines a first position of the virtual object in the AR scene to be animated in the virtual scene's coordinate system. Based upon the first positions of the virtual object and the mobile computing system, the AR animation generation system then creates a link between the virtual object and the mobile computing system such that a change in position of the mobile computing system in the real-world environment (i.e., real-world coordinate system) causes a corresponding change in the position of the virtual object in the AR scene (i.e., within the AR scene coordinate system). The user can then animate the virtual object in the AR scene using an animation technique described in this disclosure, where animating the virtual object comprises changing the position of the virtual object within the AR scene, where changing the position of the virtual object can include changing the location of the virtual object within the AR scene and/or changing the orientation of the virtual object in the AR scene. The user can animate the virtual object by manipulating a position of the physical mobile computing system, and/or by interacting with the virtual object displayed in the AR scene, such as by using a selection device, such a finger or stylus on a touchscreen displaying the AR scene, using a mouse, and the like. The AR animation generation system tracks changes to the position of the physical mobile computing system made by the user, and based upon the link information, makes corresponding responsive changes to the position of the virtual object in the AR scene. The AR animation generation system also tracks any user interactions with the virtual object made by the user using a selection device (e.g., a finger interacting with a touchscreen of the mobile computing system and displaying the AR scene) and makes corresponding changes to the position of the virtual object within the AR scene. Accordingly, responsive to inputs provided by the user by manipulating a position of the mobile computing system and/or by interacting with the virtual object via a selection device, the AR animation generation system computes new positions for the virtual object within the AR scene displayed by the mobile computing system and updates the AR scene to display the virtual object in the new positions instead of the old or previous positions. The AR animation generation system also computes how the virtual object is to be displayed at the new position and how the virtual object is to be transitioned from the old position to the new position based upon the user inputs and also based upon the animation profile data selected for the virtual object. This animation processing continues until a signal is received from the user to end the animation.

In certain embodiments, when animation has ended, the AR animation generation system outputs animation data that stores information related to the animation. This animation data can be played back, for example, using a media or animation playback program or application, to see the animation created by the user. The animation data can also be provided as input to downstream applications for further processing. For example, the animation data can be input to animation software programs that a user can use to edit the animation by editing the animation data.

The following non-limiting example is provided to introduce certain embodiments. An animator Stephen, is animating a virtual object in an AR scene, but is uncertain which virtual object is optimal and does not have the necessary skill to operate a desktop animation platform. Stephen uses the AR animation generation system to select a virtual object in the AR scene displayed by the mobile phone. Stephen touches the screen or a button to indicate to the mobile phone that he wants to start animating the scene. Stephen then moves around the real-world environment with the mobile phone. The AR animation generation system animates the selected virtual object in the AR scene and tracks Stephen's movement of the mobile phone. The AR animation generation system animates the virtual object along a corresponding path based on the movement speed and direction of Stephen. The AR animation generation system then saves the animation data including all parameters of both Stephen's inputs and the virtual object profile information.

Referring now to the drawings, FIG. 1 depicts an example of a system for generating animation in augmented reality, according to certain embodiments. In the example depicted in FIG. 1, a camera 102 captures a real-world environment view 120 and sensors 118 capture a position of mobile computing system 100. The animation generator 106, in conjunction with the AR framework 104, executes operations for performing one or more functions used in generating animation of a virtual object in an AR scene based on virtual object profile data 124, animation related parameters 122, and mobile device parameters. The virtual object 136 is displayed with AR content 134 to a user 130 via a display 116.

The camera 102 includes hardware and/or software configured to receive real-world environment view 120. The real-world environment view 120 corresponds to live images of a real environment corresponding to a field of view. These live images capture a view of the observable real-world environment corresponding to the field of view of the camera 102. The live images may correspond to one or more still images and/or live video.

In some embodiments, the camera 102 includes one or more elements for receiving the real-world environment view 120. Examples of such elements include a Charge-Coupled Device (CCD) and a Complementary Metal-Oxide-Semiconductor (CMOS) image sensor. The camera 102 is communicatively coupled to the AR framework 104 and is configured to transmit the real-world environment view 120 to the AR framework 104.

In some embodiments, the camera 102 further includes hardware and/or software configured to capture an image or video. The sensors 118 include hardware and/or software capable of capturing positional information associated with the mobile computing system 100. The mobile computing system 100 may include one or more types of sensors 118. Examples of types of sensors 118 include a gyroscope, a Global Positioning System (GPS) receiver, a Light Detection and Ranging (LIDAR) receiver, a sonar receiver, an accelerometer, a Passive InfraRed (PIR) sensor, and a camera (e.g., enabled with a filter to selectively receive infrared light).

The mobile computing system 100 includes functionality to receive input from a user 130. In some embodiments, user input may be received via the display 116 (e.g., via a touchscreen). In other embodiments, the user input may be received via a microphone configured to detect voice commands, or tactile buttons of the mobile computing system.

In some embodiments, the user input received by the mobile computing system 100 characterizes a particular view of the real-world environment. This particular view may be defined by the real-world environment view 120 captured by the camera 102 at a specific position of the mobile computing system 100. As an example, the AR framework 104 may track the position information via position/orientation tracker 108 while the camera 102 is capturing video. In another aspect, the AR framework the user 130 includes animation related user input 132. For instance, the user 130 may include a selection or movement of a virtual object in an AR environment.

The AR framework 104 includes hardware and/or software configured to generate an AR environment. In some embodiments, the AR framework 104 includes a position/orientation tracker 108, an AR content generator subsystem 112, and a renderer 110.

In some embodiments, the position/orientation tracker 108 is configured to track location and orientation data during an AR session. During a session, position/orientation tracker 108 is configured to maintain a correspondence between the real-world environment space that the mobile computing system 100 inhabits and a virtual space where virtual AR content is modeled and placed. The position/ location tracker 108 includes hardware and/or software configured to track and calculate a position and orientation of the mobile computing system 100 in real-world environment and maintain a correspondence in virtual space in which the virtual object, virtual frame, and virtual direction information are modeled. The position/location tracker 108 receives, as input, real-world scene information from the camera 102. The position/location tracker 108 also receives position and orientation information from one or more sensors 118 of mobile computing system 100. The position/location tracker 108 tracks and calculates the position and orientation of the mobile computing system 100 in real-time based upon information received from the camera 102 and/or sensors 118.

In some embodiments, the position/location tracker 108 maps the environment based on the images and/or sensor data retrieved. For example, the position/location tracker 108 extracts image features such as flat surfaces from a received first image. As a specific example, the tracking subsystem uses visual-inertial odometry to combine motion data and image data to recognize and track features in an image stream obtained by the mobile computing system 100. In some embodiments, the tracking subsystem uses Simultaneous Localization and Mapping (SLAM). SLAM involves incrementally constructing a map of the environment using key points and landmarks within a three-dimensional environment, and may use a combination of image data and other sensor data. The position/location tracker 108 provides the position and orientation information to the animation generator 106 and the AR content generator subsystem 112.

The animation generator 106 includes hardware and/or software configured to generate an animation of a virtual object in the AR scene, where the virtual object has an animation profile. The animation profiles are stored in virtual object profile data 124 and include parameters that specify types of motion for the virtual object. An example is a planar surface interaction parameter that defines how the virtual object interacts with planar surfaces (e.g., a "car" object is bound to planar surfaces and gravity forces as compared to a "plane" object that can generate lift when departing contact with a planar surface). The animation generator 106 also utilizes animation related parameters 122, and mobile device parameters 126 (e.g., location, orientation, acceleration, etc.) to generate the animation of the virtual object in the AR scene. The animation generator provides virtual object data 128 to the AR content generator subsystem 112.

In some embodiments, the animation generator 106 receives position information from the position/location tracker 108. For instance, the animation generator 106 may receive mobile device parameters 126, examples of which are: location data such as height, geographic location (x. y, z), acceleration data, relationships of objects and virtual objects in the AR scene. The animation generator 106 animates a virtual object 136 in the AR content 134 by producing virtual object data 128 and animation data 114 from mobile device parameters 126, animation related parameters 122, and virtual object profile data 124.

For example, the animation generator 106 may determine a first position of the mobile computing system 100. In some cases, the first position of the mobile computing system 100 may be recorded when an animation related user input 132 is received indicating the start of an animation. The animation generator 106 records the mobile device parameters from position/location tracker 108 from the start of the animation until a user input to stop the animation is received.

The animation generator 106 generates an animation for the virtual object 136 that is selected. The animation generator combines the mobile device parameters and virtual object profile data 124 as described in further detail with regard to FIGS. 2-3. For example, the animation generator 106 combines movement, location, and orientation data of the mobile computing system 100 with the virtual object profile data 124 to produce a virtual object animated by the mobile device parameters 126.

A brief example of the animation generator is that the mobile computing system is located at a position (X1, Y1, Z1) with an orientation (O1) when the animation related user input 132 to start animation is received. The user 130 also selects a virtual object in the AR content. The position/location tracker 108 monitors movement (e.g., X2, Y2, Z2) or change in orientation (O2) of the mobile computing system 100 (e.g., the user 130 moves or changes orientation of the mobile computing system 100). The animation generator 106 converts the change in location or orientation of the mobile computing system 100 to the virtual object 136 and applies adjustments based on the virtual object profile data 124 or animation parameters 122 as described with regard to FIGS. 2-4A-F. In some examples, the animation generator may also use machine learning/artificial intelligence (ML/AI) controller 113 to adjust the animation based on training data for a specific object (e.g., an airplane, a car, a helicopter, etc.) that have motions associated with the object in addition to the position in space.

In some embodiments, the animation generator 106 may identify one or more planes or surfaces of the real-world environment view 120 (e.g., a table, floor, ceiling, wall, window, etc.) that has a set of properties that are included in the animation. For instance, a planar surface, such as a table, may be included as a reference for the virtual object 136. In some aspects, the virtual object 136 may interact with or around the planar surface and the animation generator 106 may adjust the animation to account for the set of properties of the planar surface. In one example, the animation generator 106 animates a virtual object being moved along a table. The animation generator 106 uses the set of properties of the table (surface material, opacity, reflectivity, height) to animate the virtual object 136. In this example, the animation generator will animate the virtual object 136 with appropriate shadows, and surface interactions (sliding across the table, departing the surface of the table) based on the set of properties of the table and the virtual object profile data 124. The animation generator may also alter the appearance of the virtual object based on orientation of the table (e.g., clipping the virtual object from moving below the surface).

The animation generator 106 provides the virtual object data 128 to the AR content generator subsystem 112. The AR content generator subsystem 112 combines the virtual object data 128 and the scene of the real-world environment view 120 captured by the camera 102. The AR framework 104 applies renderer 110 to produce AR content 134 including virtual object 136. The mobile computing system 100 displays AR content 134 including the virtual object 136 to the user 130 via display 116.

Figure 2:
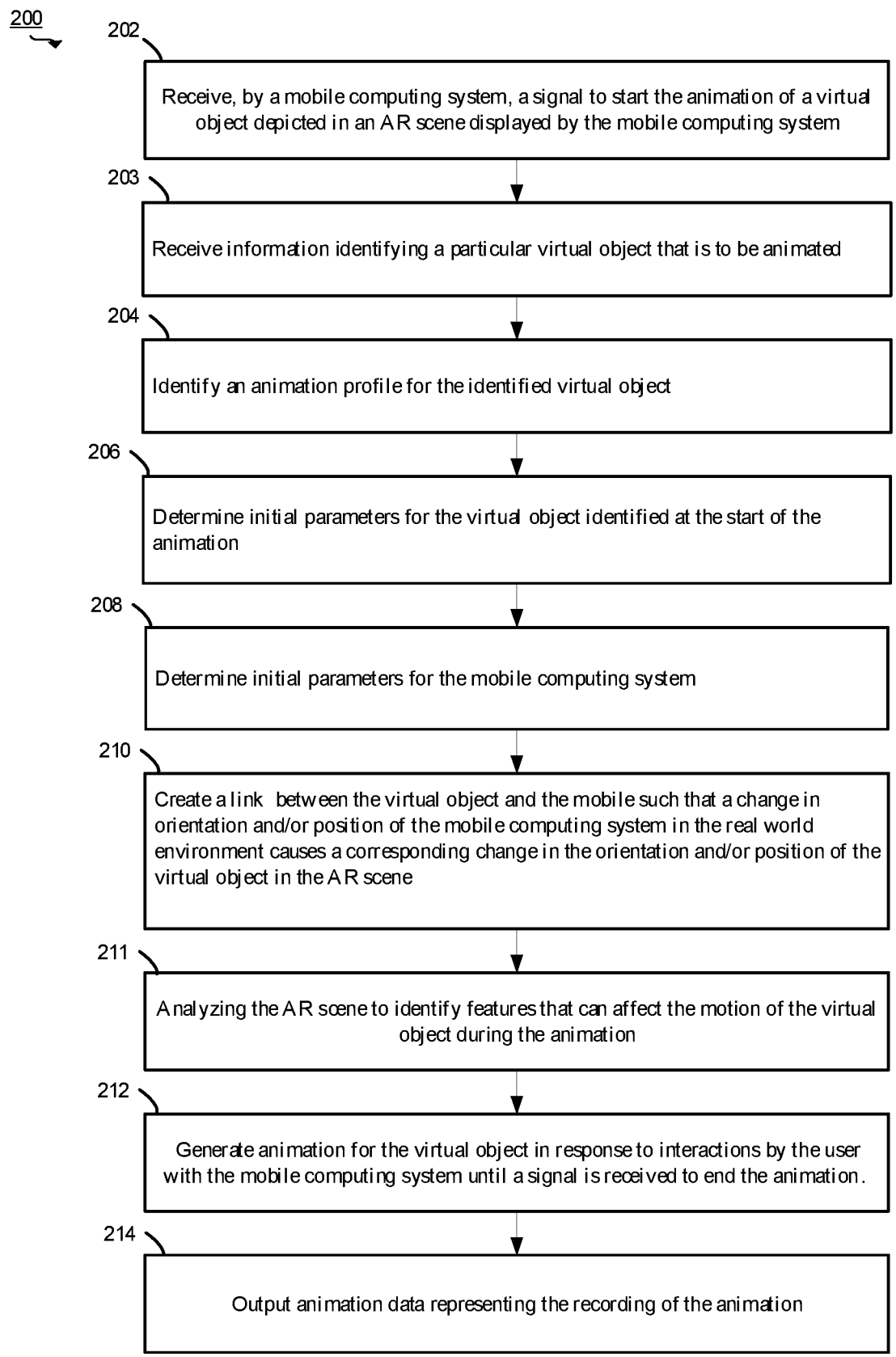
FIG. 2 depicts an example of a method for generating animation using augmented reality, according to certain embodiments.

FIG. 2 depicts an example of a method 200 for generating animation in an AR environment, according to certain embodiments. The processing depicted in FIG. 2 may be implemented in software (e.g., code, instructions, program) executed by one or more processing units (e.g., processors, cores) of the respective systems, using hardware, or combinations thereof. The software may be stored on a non-transitory storage medium (e.g., on a memory device). The method presented in FIG. 2 and described below is intended to be illustrative and non-limiting. Although FIG. 2 depicts the various processing steps occurring in a particular sequence or order, this is not intended to be limiting. In certain alternative embodiments, the processing may be performed in some different order or some steps may also be performed in parallel. In certain embodiments, such as in the embodiment depicted in FIG. 1, the processing depicted in FIG. 2 may be performed by animation generator system 106 in collaboration with the other systems and subsystems depicted in FIG. 2.

For the purposes of FIG. 2 and its accompanying description, it is assumed that a user or animator is interested in animating a virtual object depicted in an AR scene displayed by a mobile computing system used by the user. The mobile computing system may, for example, be the user's mobile phone. The AR scene may depict one or more virtual objects overlaid on real-world environment content. The real-world environment content may correspond to content (e.g., a video stream) captured by a camera of the mobile computing system. The AR scene may be depicted through the GUI displayed by the mobile computing system. The GUI may be corresponding to an AR application or other application executed by the mobile computing system.

At 202, the method 200 is triggered when a signal is received by a mobile computing system to start the animation of a virtual object depicted in an AR scene displayed by the mobile computing system. In certain embodiments, the signal may be received in response to a user input indicating that a special animation generation mode is to be started or entered into during which the user can animate a virtual object in the AR scene. For example, the user may select a "Record" or "Start Animation" button displayed by the mobile computing system (e.g., button displayed by a GUI displayed by the mobile computing system). In other examples, the user may provide some particular interaction (e.g., a voice command "cut" or "stop recording") that indicates stoppage of the animation. Receiving the signal in 202 then causes an animation mode to be started during which the user can animate the virtual object. For the embodiment depicted in FIG. 1, the signal in 202 may be received by the animation generator 106.

At 203, information may be received identifying a particular virtual object that is to be animated. There are various ways in which a user can identify or select the particular virtual object to be animated. For instance, whichever virtual object in the AR scene that the user interacts with after entering the animation mode may be selected as the virtual object to be animated. For example, if the AR scene is being displayed to the user via a touchscreen of the mobile computing system, the user may select a particular virtual object to be animated by touching an area of the touchscreen displaying the virtual object. The particular virtual object may also be selected based upon user inputs from other input devices communicatively coupled to the mobile computing system (e.g., a bluetooth controller, gaze point tracker, etc.).

While 202 and 203 are shown as two separate steps in FIG. 2, this need not be the case. In certain embodiments, the signal to enter the animation generation mode and the selection of the virtual object to be animated may be provided through a single user input, such as by the user performing a special touchscreen-based gesture that selects the virtual object to be animated and also indicates to the animation generator 106 that animation generation mode is to be started.

At 204, an animation profile to be used for animating the virtual object selected for animation in the AR scene. The mobile computing system may store the animation profiles locally or access remotely stored animation profiles.

In certain embodiments, multiple animation profiles may be provided for different types of virtual objects. A user may select a particular animation profile that is configured for the virtual object to be animated. For example, a first animation profile may be selected for animating an automobile, a second animation profile may be selected for animating a helicopter, a third animation profile may be selected for animating an airplane, a fourth animation profile may be selected for animating a human, a fifth animation profile may be selected for animating a rocket, and the like. Accordingly, if the virtual object selected in 203 is a helicopter, then the user may select the helicopter animation profile for animating the virtual object.

In certain embodiments, an animation profile for a particular type of virtual object stores information that specifies parameters for controlling the behavior of the object, such as how the virtual object is displayed at particular positions, how the virtual object is animated from one position to the next position, how the virtual object reacts to its surroundings (e.g., to other planes and objects in an AR scene), and the like. The animation profile is used to influence the animation of a virtual object so as to make the animation more realistic and consequently of a higher quality. For example, the animation profile for an airplane may include information such as: information identifying an arc or path (e.g., a 3-D spline) to be followed by the airplane during a takeoff; information identifying an arc or path (e.g., a 3-D spline) to be followed by the airplane during a landing; a smoothing spline used for smoothing a movement path for the virtual object; information relating to the airplane's interaction with a particular planar surface (e.g., the planar surface such as the ground on which the airplane sits prior to the start of the animation); information regarding the plane's orientation when making a sharp right or left turn; information regarding the plane's orientation when making a sharp right or left turn, etc. An animation profile for a particular virtual object thus contains information and parameters related to the motion and orientation of the particular virtual object so as to make the movement of the virtual object during the animation more realistic. Further details of the virtual object profiles are described with regard to FIG. 4A-F.

In certain embodiments, the association between a virtual object and the animation profile to be used for that virtual object may be created prior to the processing depicted in FIG. 2. For example, a user may, prior to the animation, create an association between a virtual object and an animation profile. In certain embodiments, this association information may be stored as part of the metadata for the virtual object (e.g., part of the model representing the virtual object). In such a scenario, the user need not provide the animation profile information in 204. As part of the processing in 204, the animation generator 106 may determine a specific animation profile to be used from the metadata associated with the virtual object selected in 203.

In certain embodiments, the animation generator 106 may determine which animation profile to be used for a selected virtual object based upon the characteristics of the virtual object. For example, each virtual object may be represented by a model that stores information identifying characteristics of the virtual object. This model information may identify the type of the virtual object (e.g., whether it is a car, an airplane, etc.). The animation generator 106 may use this information to automatically identify an animation profile to be used for the virtual object from among the multiple available animation profiles. In yet other embodiments, a default animation profile may be selected by the animation generator 106 for a virtual object to be animated.

At 206, the method 200 involves determining initial parameters for the virtual object at the start of the animation. For instance, the animation generator 106 may determine the start or initial position of the virtual object in the AR scene. This may include determining a starting location of the virtual object in the AR scene (e.g., ($X_1$, $Y_1$, $Z_1$) in the coordinate system of the AR scene) and determining an orientation (i.e., pitch, yaw, roll, and associated degrees between 0-359) for the virtual object in the AR scene. The animation generator 106 can determine the first location and orientation by analyzing the virtual object selected for the animation. The animation generator 106 may also determine other initial parameters related to other characteristics of the virtual object being animated.

At 208, the method 200 involves determining initial parameters for the mobile computing system. For instance, the animation generator 106 may determine the start or initial position of the mobile computing system in the real-world environment. This may include determining a starting location of the mobile computing system in the real-world environment (e.g., ($X_2$, $Y_2$, $Z_2$) in the coordinate system of the real-world environment) and determining an orientation (i.e., pitch, yaw, roll, and associated degrees between 0-359) for the mobile computing system in the real-world environment. The information in 208 may be determined from various sensors of the mobile computing system, such as an accelerometer, global positioning system, mobile triangulation transmitter, near field communication location, or other methods of position determination of mobile computing systems.

At 210, the method 200 involves creating a link (or correlation information) between the virtual object and the mobile computing system based upon the parameters determined in 206 and 208. In certain embodiments, the link created is such that it enables a change in the position (orientation and/or location) of the mobile computing system in the real-world environment to be translated to a corresponding change to be made to the position (orientation and/or location) of the virtual object in the AR scene.

In certain embodiments, the animation generator 106 generates a transform equation that can subsequently be used to, given a change in position or a new position of the mobile computing system in the real-world environment, determine a new position for the virtual object in the AR scene.

In a non-limiting example, a first position of a virtual object (e.g., an airplane) in an AR scene coordinate system may be determined to be location:(1, 1, 3) with an orientation: (roll,) 090°. An initial position for the mobile computing system in a real-world environment coordinate system may be determined to be location:(2, 4, 6) with an orientation: (roll, 120°). In certain embodiments, the animation generator 106 "ties" these two positions together such that a change in the position of the mobile computing system in real-world environment can be translated to new position for the virtual object in the AR scene. The "tying" may be represented by a transform equation. For example, if subsequently the animation generator 106 detects a change in position of the mobile computing system to a new location: (4, 5, 3) and a new orientation:(roll, 180°), the animation generator 106 uses the link or transform equation to compute a new corresponding position for the virtual object in the AR scene. For example, in this example, the change in location and orientation of the mobile computing system in the real-world environment is (2, 1, −3) with an orientation change of (roll, 60°). The animation generator 106 may compute the corresponding position of the virtual object in the AR scene is at location:(3, 2, 0) in the AR scene with a subsequent orientation of (roll, 140°). One or more of parameters may be used to constrain the motion of orientation change for the virtual object within the AR scene during the animation. For example, if the virtual object being animated is a car, the car will change orientations in a curvilinear manner (e.g., cannot turn via rolling, yawing, etc.).

At 211, the AR scene is analyzed by the animation generator 106 to identify features that can affect the motion of the virtual object during the animation. For example, as part of the processing in 211, the animation generator 106 may identify the planes in the AR scene and determine their dimensions and positions. The planes may correspond to, for example, the floor or ground, a ceiling, a table surface, side of a building, etc. appearing in the AR scene. These planes are then taken into consideration when the virtual object is animated in 212. One or more of the planes may be used to constrain the motion of the virtual object within the AR scene during the animation. For example, if the virtual object being animated is a car, the car cannot pass through solid surfaces (e.g., cannot pass through a wall, through the ground, etc.). This increases the realism of the animation.

As part of the processing in 211, a particular plane on which the virtual object rests prior to the animation may also be identified. In certain situations, the movement of the virtual object within the AR scene during the animation may be clamped to this particular plane. For example, if the virtual object to be animated is a car, then the ground plane on which the car sits may be determined and the movement of the car as a result of the animation may be clamped to this ground surface.

At 212, the method 200 involves animating the virtual object in response to interactions by the user with the mobile computing system. The process of animating the virtual object may continue until a signal is received to end the animation. The animating performed in 212 includes changing the position (location and/or orientation) of the virtual object in the AR scene responsive to the user's interactions with the mobile computing system. The animation is further influenced by the animation profile determined for the virtual object in 204. Additionally, as part of 212, the animation process is recorded.

Different animation technique or modalities may be used for animating the virtual object in 212. In certain embodiments, the virtual object can be animated by (1) The user manipulating the position (location and/or orientation) of the physical mobile computing system in the real-world environment. In certain embodiments, the animation generator 106 is configured to monitor changes to the position of the mobile computing system in the real-world environment. Given a change, the animation generator 106 uses the link generated in 210 to determine corresponding positions (locations and/or orientations) for the virtual object in the AR scene. The animation generator 106 then may send the updated virtual object position information to the AR framework 104, which causes the AR scene to be updated to display the virtual object in the new position.

(2) The user interacting with the virtual object displayed in the AR scene using a selection device, for example, the user's finger or stylus on a touchscreen displaying the AR scene, using a mouse, and the like. The animation generator 106 is configured to monitor the user's interactions with virtual object to determine new positions for displaying the virtual object in the AR scene.

(3) Using a combination of (1) and (2). The user may animate the virtual object by manipulating the physical mobile computing system and also by interacting with the virtual object displayed in the AR scene using a selection device.

Figure 3:
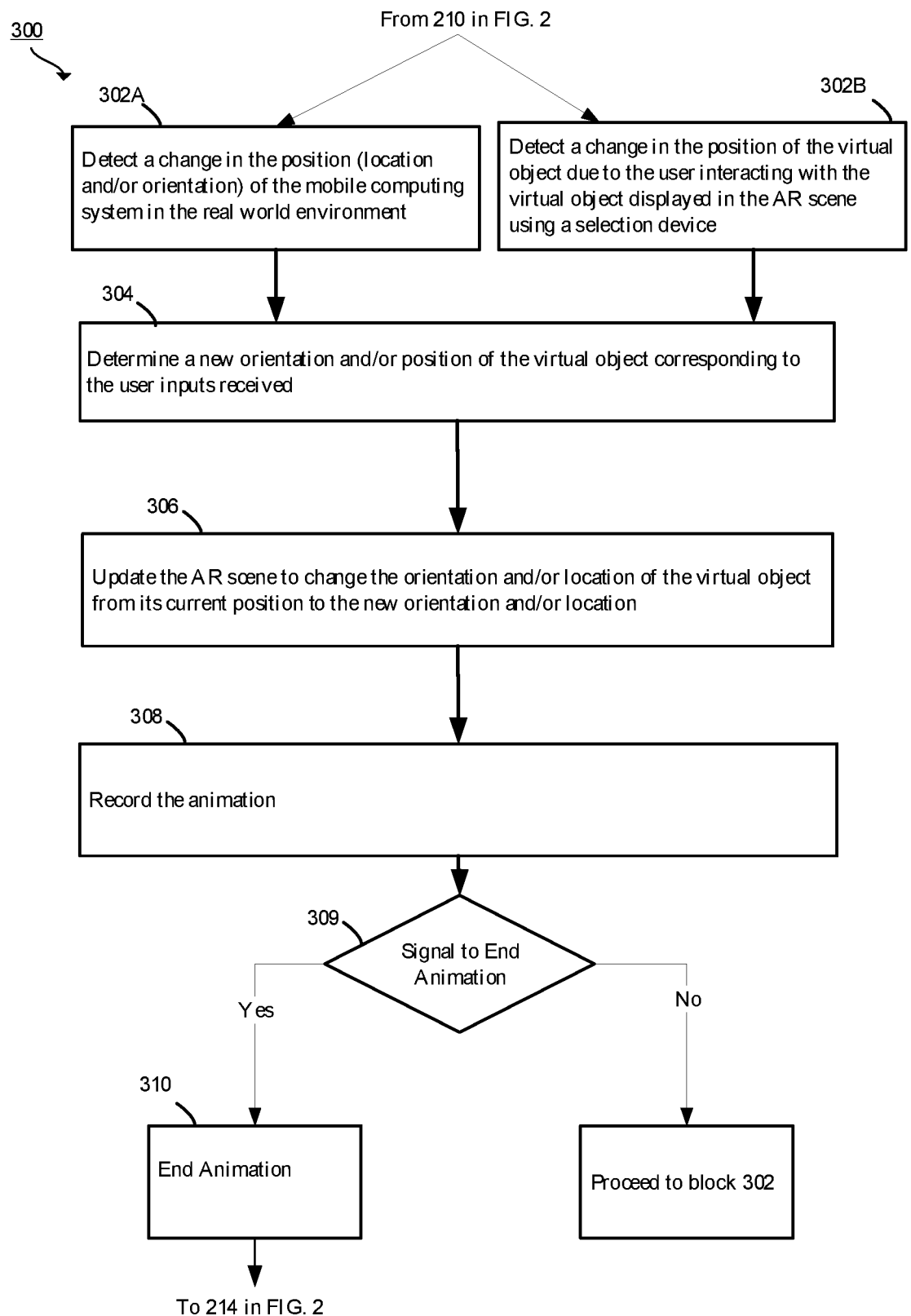
FIG. 3 depicts an example of a method for animating a virtual object in a scene based on augmented reality inputs, according to certain embodiments.

In addition to determining the new positions for the virtual object in the AR scene, the animation generator 106 also determines how the animation profile influences the animation. For example, based upon the animation profile, the animation generator 106 may determine how the virtual object is to be displayed at the new position, and also how the virtual object is to be animated from the previous position to the new position in the AR scene. For example, the animation generator 106 may determine a path and positioning of the virtual object when being moved from a previous position in the AR scene to a new position in the AR scene. In certain embodiments, the user may also change the animation profile that is being used in 212. As part of 212, the animation generator 106 may provide the animation information the AR framework 104, which may continuously update the AR scene to show the changed positions of the virtual object in the AR scene. Further details related to the processing performed in 212 are depicted in FIG. 3 and described below.

As part of 212, the animation of the virtual object is recorded. The animation and the recording continues until a signal is received by the animation generator 106 indicating that the animation is to be ended. Upon receiving this signal, the animation and the recording is stopped.

At 214, the animation generator 106 outputs animation data representing the recording of the animation. The animation data may be persisted to a non-volatile memory local to the mobile computing system, or remote from the mobile computing system (e.g., memory of another processing device, a network memory location, etc.).

The animation data stores information related to the recorded animation. The information stored by the animation data may include information such as information regarding: the virtual object being animated; the AR scene; the animation profile used for the animation; a path (e.g., represented by a 3-D spline) followed by the virtual object during the animation; a 2-D representation of the 3-D spline (e.g., a path on the ground traced by an airplane in 3-D space in the AR scene); position information (location and/or orientation) for the virtual object during the animation; and the like. The animation profile of the virtual object also impacts the visual properties of the animation data stored. For example, the animation profile includes parameters to specify whether a reflection of the virtual object is to be shown, whether a 2-D path (path on the ground) corresponding to a 3-D path traversed by the virtual object is to be shown, whether a 3-D path showing the exact path of the virtual object is to be shown, or whether the path is to be visually hidden for downstream operations (e.g., playback, editing, etc.).

Various operations may be performed using the animation data. The animation data can be played back, for example, using a media or animation playback program or application, to see the animation created by the user. For example, the AR application may provide a "Preview" mode that plays back the animation using the animation data. The animation data can also be provided as input to downstream applications for further processing. For example, the animation data can be input to an animation software program that a user can use to edit the animation by editing the animation data. For example, a user may edit the animation data to further refine the animation (e.g., edit the spline represented by the animation data to further refine or change the animation). In certain embodiments, the user may also use the animation software program to change the animation profile used for the animation to a new animation profile, which in turn changes the animation. Alternatively, the user may change one or more parameters associated with the animation profile used, which in turn, changes the animation of the virtual object. Accordingly, the animation data generated by the animation generator 106 can be used for various downstream purposes. An example of editing a parameter is to provide an input on whether the path generated by the animation generator 106 followed by the virtual object is a "closed loop." This parameter is specified in the virtual object profile data. For instance, if the virtual object profile data indicates that the animation of the virtual object is "closed loop", then the start point and the end point of the animation are connected such that the animation can be played in a continuous loop. In an animation where the second position and the first position of the virtual object are not in the same position, the animation generator 106 may interpolate or otherwise compute a path between the second location and the first location to provide a closed loop animation.

FIG. 3 depicts an example of a method for animating a virtual object in a scene based on augmented reality inputs, according to certain embodiments.

Although FIG. 3 depicts the various method steps occurring in a particular sequence or order, this is not intended to be limiting. In certain alternative embodiments, the steps may be performed in some different order or some steps may also be performed in parallel.

At 302A, the method 300 involves detecting a change in the position (location and/or orientation) of the mobile computing system in the real-world environment. The mobile computing system can detect a user manipulating the position (location and/or orientation) of the physical mobile computing system in the real-world environment. In certain embodiments, the animation generator 106 is configured to monitor changes to the position of the mobile computing system in the real-world environment. In an example, the animation generator 106 receives input from various sensors of the mobile computing system (e.g., accelerometer, GPS, etc.).

At 302B. the method 300 involves detecting a change in the position of the virtual object due to the user interacting with the virtual object displayed in the AR scene using a selection device. The mobile computing system is configured to detect a user interacting with the virtual object displayed in the AR scene. For example, a user interaction with the virtual object could include a movement of the user's finger or stylus on a touchscreen displaying the AR scene, using a mouse, and the like.

At 304, the method 300 involves determining a new position of the virtual object and parameters of how the virtual object appears at the new position. For instance, the animation generator 106 computes, based upon the inputs received in 302A and 302B, and further based upon the animation profile, the following are determined by the animation generator:

(1) a new position for the virtual object in the AR scene. The animation generator receives inputs from the user as described in blocks 302 and 304 to compute a new position of the virtual object in the AR scene. The animation generator 106 receives inputs from 302A and computes the new position of the virtual object using the link or transform equation that represents the relationship between the first position of the virtual object and the first position of the mobile computing system. The animation generator 106 determines a transform equation that computes the new position of the virtual object in the AR scene from the new position of the mobile computing system in the real-world environment. The animation generator 106 receives inputs from 302B and determines the new position of the virtual object by computing the first position of the virtual object, and manipulating the virtual object's position based on the translation of the user input received (e.g., a user moves a stylus from a first position on the touchscreen to a second position on the touchscreen).

(2) The animation generator 106 determines an appearance of the virtual object in the new position. For example, a virtual object having a profile of "airplane" will have a particular appearance at various positions (e.g., nose and tail orientation, wing positions, etc.). The animation generator determines the appearance of the virtual object for displaying in the AR scene at the new position.

(3) The animation generator 106 determines an animation behavior of the virtual object in transitioning from the first position in the AR scene to the second position in the AR scene. For example, the animation generator 106 generates the animation behavior of the virtual object using virtual object profile data 124 in combination with the animation related parameters 122. The animation generator 106 defines certain virtual object behaviors as the virtual object transitions between positions in the AR scene. Examples of these virtual object behaviors include turns (rapid and/or slow), positioning with respect to a plane/surface (e.g., car cannot go below ground plane, behavior of a human changes depending upon distance from the ground (e.g., stand, kneel, prone), motions in response to rate of change of positions of the mobile computing system (e.g., walking or running for a human, jumping higher versus lower for an animated object, showing turbo burners or not for a plane depending on how fast the plane is to be determined as moving).

At 306, the mobile computing system updates the AR scene, based on the information computed at block 304, such that (a) the virtual object is now displayed in the second position instead of the first location in the AR scene, (b) the virtual object is displayed at the new position having the appearance determined in 304, and (c) the transition from the first position to the second position is animated as per the parameters determined in block 304. The animation generator 106 sends virtual object data 128 to the AR framework 104 for display in the AR scene. The virtual object data 128 includes the second position of the virtual object, the appearance of the virtual object at the second position, and the transition of the virtual object from the first position to the second position.

At 308, the method 300 involves recording the animation. For example, the animation of the virtual object is recorded by the animation generator and stored in animation data 114.

At 309, the mobile computing system receives an input to stop the recording of the animation. In certain embodiments, the signal may be received in response to a user input indicating that the special animation generation mode is to be stopped or exited. For example, the user may deselect a "Record" button displayed by the mobile computing system (e.g., button displayed by a GUI displayed by the mobile computing system). In other examples, the user may select a stop recording button, or may provide some particular interaction (e.g., a voice command "cut" or "stop recording") that indicates stoppage of the animation. Receiving the signal at 309 then causes an animation mode to be stopped.

For the embodiment depicted in FIG. 1, the signal in 309 may be received by the animation generator 106. If the animation generator receives the signal to stop animation, the method 300 proceeds to block 310 and the animation is stopped. As illustrated in FIG. 3, after ending the animation, the method 300 proceeds to block 214 in FIG. 2 to output the animation data. In an example where the signal to stop animation is not received, the method 300 returns to block 302A, 302B, or a combination to detect additional changes in position of the mobile computing system or additional user interactions with the AR scene.

Additionally, the animation of the virtual object is impacted by the animation profile in virtual object profile data. Various parameters in virtual object profile data affect the generated animation according to the specific type of object. The virtual object profile data enables an animation that appears more similar to a real-world object that the virtual object is representing in the AR scene. For example, a real-world helicopter, airplane, and car behave and move differently. Further, even a transition between similar positions appears differently based on the speed of travel, planar surface interactions or clamping, and alignment of the objects through turns, rolls, or yaw.

In one example, the animation profile of a virtual object is used to smooth a user-provided path such that the resultant animation is not choppy but smooth and thus more pleasing to the eye leading to better quality animation. For instance, the path for the virtual object indicated by the user by manipulating the mobile computing system and/or by interacting with the virtual object via a touchscreen may define a user-provided curve or path, but in some cases, the input of the user lacks stability, continuity of motion, or aberrations may occur. A user may not manipulate the position of the mobile computing system in a smooth movement and accordingly, the animation profile of the virtual object can limit the impact of the choppy or unstable movements from appearing in the generated animation.

The animation profile of a virtual object can also be used to constrain certain aspects of the movement of the virtual object. Examples of constraints are to lock (i.e., make them unchangeable) one or more certain degrees of motion for the virtual object. For example, lock the yaw for a virtual object such that even if the mobile computing system does a yaw, there is no corresponding yaw motion imparted to the virtual object in the AR scene. In other examples, the animation profile of a virtual object can control or define certain virtual object behaviors such as turns (rapid and/or slow), positioning with respect to a plane/surface (e.g., car cannot go below ground plane, behavior of a human changes depending upon distance from the ground (e.g., stand, kneel, prone), motions in response to rate of change of positions of the mobile computing system (e.g., walking v. running for a human, jumping higher versus lower for an animate object, showing turbo burners or not for a plane depending on how fast the plane is to be shown as moving);

FIGS. 4A-4F depict examples of generating animation data using augmented reality, according to certain embodiments.

Figure 4A:
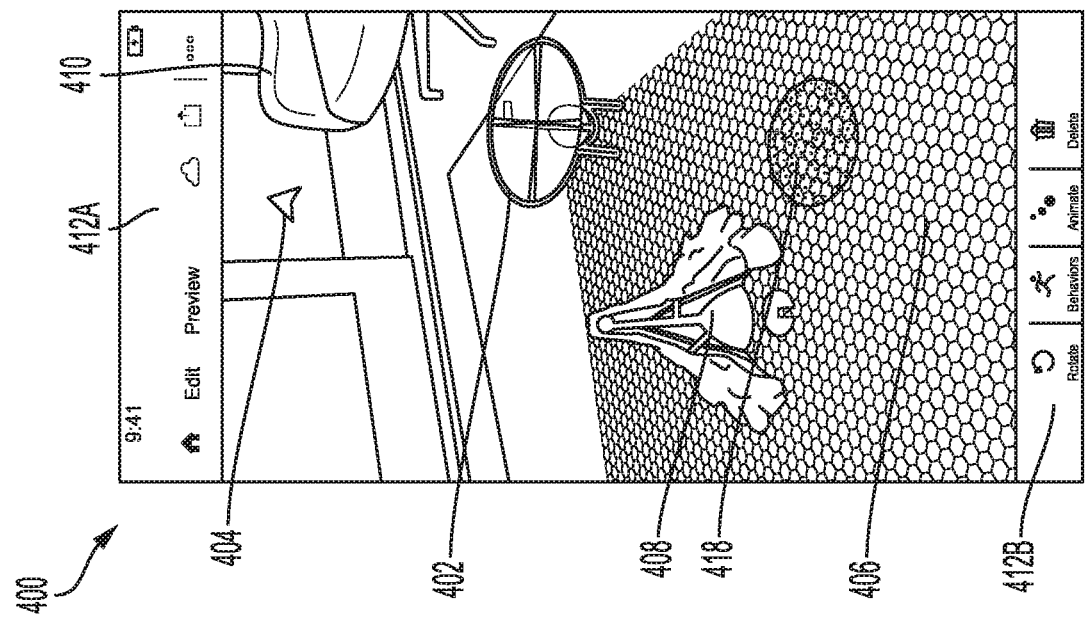
FIGS. 4A-4F depict examples of generating animation data using augmented reality, according to certain embodiments.

FIG. 4A depicts a mobile computing system displaying an AR scene 400 including the real-world environment and virtual objects.

In the particular example of FIG. 4A, the AR framework produces the AR scene 400 that includes a helicopter 402 (virtual object), a volcano 408 (virtual object), a planar surface 406 (rug), and a chair 410 (real-world object). In this example, FIG. 4A is an example prior to the mobile computing system receiving a signal to start an animation. The AR framework produces the AR scene 400 and can overlay a top menu bar 412A or a bottom menu bar 412B on the AR scene to provide an interface for receiving user inputs (i.e., via a touchscreen interface menu bar). The AR scene 400 includes a mobile computing system orientation indicator 404.

The AR framework produces the AR scene 400 that includes virtual object data generated by the animation generator for rendering in the AR scene as described with regard to FIG. 1. The animation generator includes virtual object profile data which includes parameters that indicate various attributes of the virtual object. For instance, the AR scene 400 includes a shadow 418 of the helicopter 402 projected onto the planar surface 406. The animation generator generates the shadow 418 by incorporating parameters of the virtual object profile data from an object type "helicopter" and the surface and environmental responses to lighting effects and light exposure. In this example, the helicopter 402 is at a position on the planar surface 406.

Figure 4B:
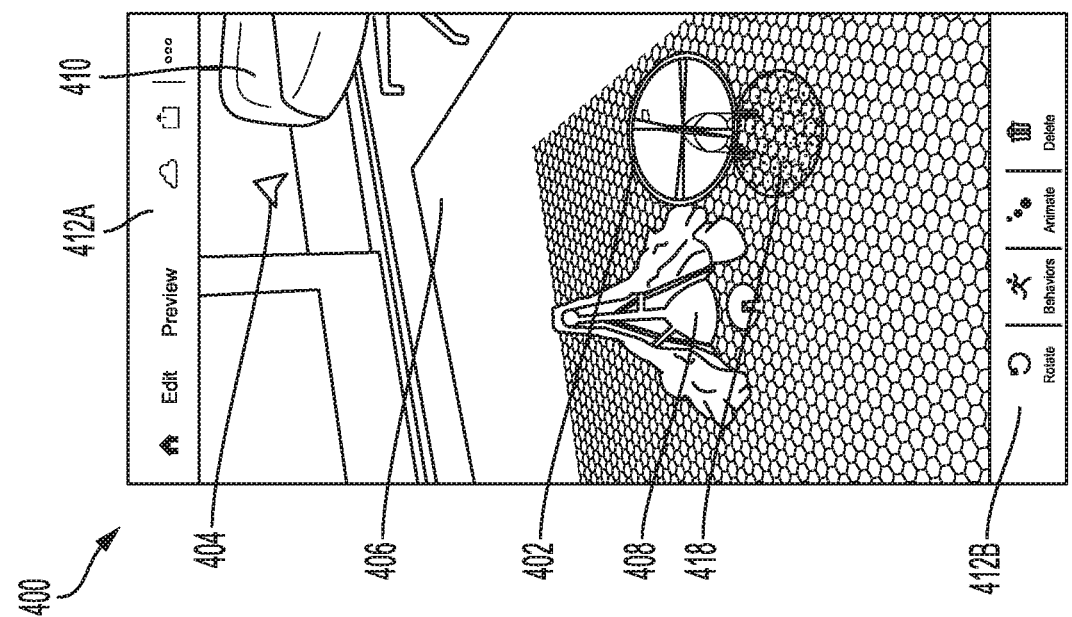

FIG. 4B depicts a mobile computing system displaying an AR scene 400 including the real-world environment and virtual objects.

In FIG. 4B, the mobile computing system has not received a signal to start animation. In this example, the helicopter 402 has a first position that is at a height above the planar surface 406. The AR scene 400 includes the volcano 408, the chair 410, shadow 418 and mobile computing system orientation indicator 404. The AR scene includes top menu bar 412A and bottom menu bar 412B.

Figure 4D:
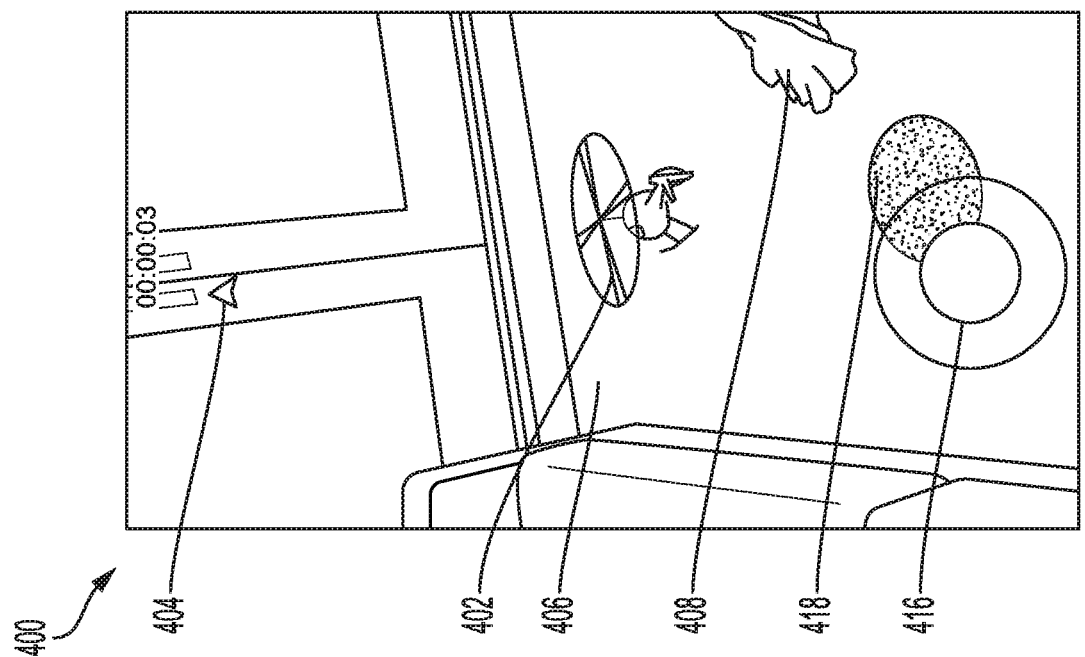
Figure 4C:
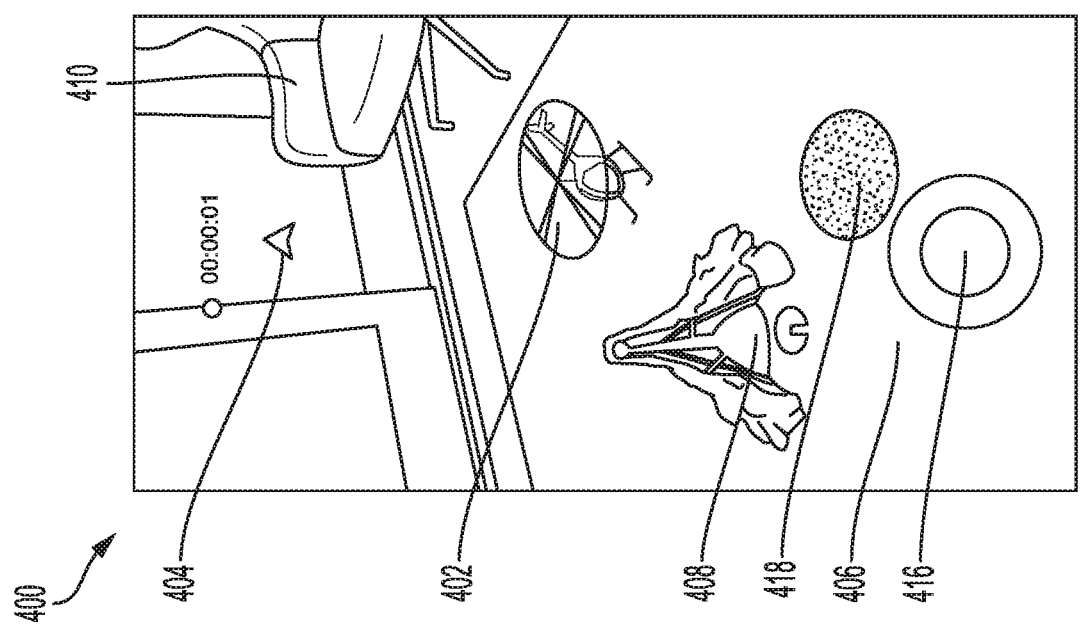

FIG. 4C depicts a mobile computing system displaying an AR scene 400 including the real-world environment and virtual objects.

In this example, FIG. 4C is an example of the mobile computing system after receiving a signal to start an animation. The AR framework produces the AR scene 400 that includes a mobile computing system orientation indicator 404. The animation generator provides virtual object data related to helicopter 402 to the AR framework for rendering and display. The AR framework adjusts the AR scene 400 to display an animation recording indicator 416. In one example, the animation recording indicator 416 may be a pulsating red dot with a solid inner area and a semi-opaque outer area to indicate to the user that animation is in progress. The animation generator and/or position/orientation tracker receives inputs from the user indicating a change in position or orientation of the mobile computing system and computes a corresponding change in position or orientation of the helicopter 402. The animation generator includes various parameters of the virtual object profile data to generate the helicopter 402. For example, the animation generator depicts the helicopter with the nose of the helicopter pointing in the orientation of the virtual object.

FIG. 4D depicts a mobile computing system displaying an AR scene 400 including the real-world environment and virtual objects.

In this example, FIG. 4D is an example of the mobile computing system after receiving a signal to start the animation. The AR framework produces the AR scene 400 that includes a mobile computing system orientation indicator 404. The animation generator has received inputs from the user indicating a change in position or orientation of the mobile computing system. The animation generator computes a corresponding change in position or orientation of the helicopter 402. The animation generator updates the position and orientation of the helicopter 402 in the AR scene 400. FIG. 4D illustrates the helicopter 402 in a position that has been moved to the left and into the scene.

FIG. 4D illustrates this by removing the chair 410 from the AR scene and modifying the appearance of the volcano 408.

The animation generator includes various parameters of the virtual object profile data to generate the helicopter 402. For example, the animation generator depicts the change in position of the helicopter by animating the nose of the helicopter in the direction of movement for the virtual object. The animation generator also includes parameters relating to the movement of the helicopter 402 such as adjusting the tilt (e.g., a nose down, tail rotor up) of the helicopter 402 and adjusting the shadow 418 to depict the tail rotor realistically.

Figure 4F:
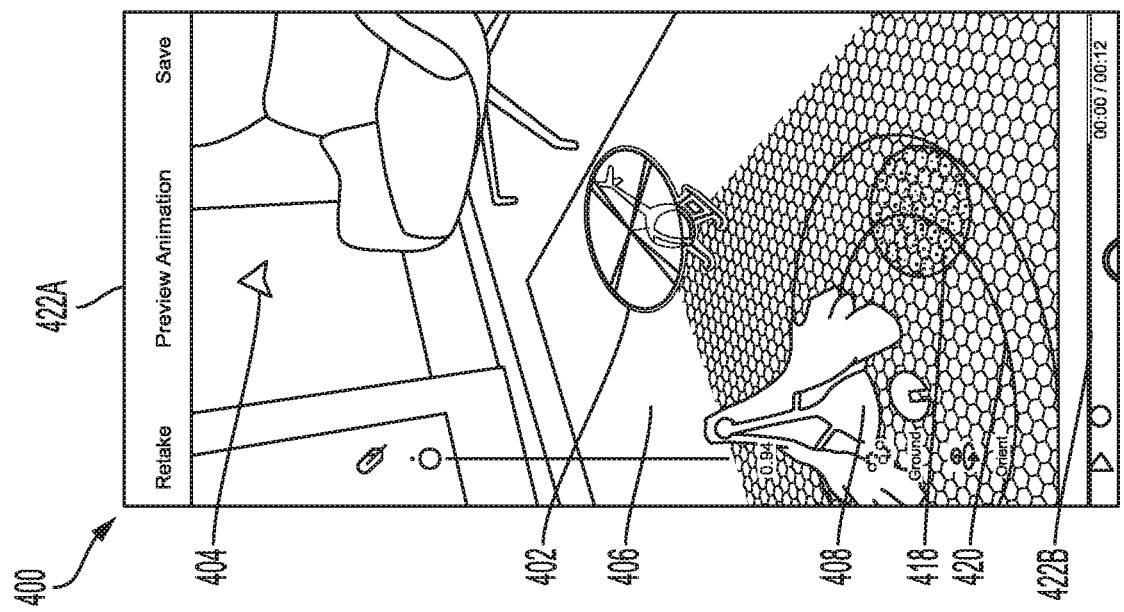
Figure 4E:
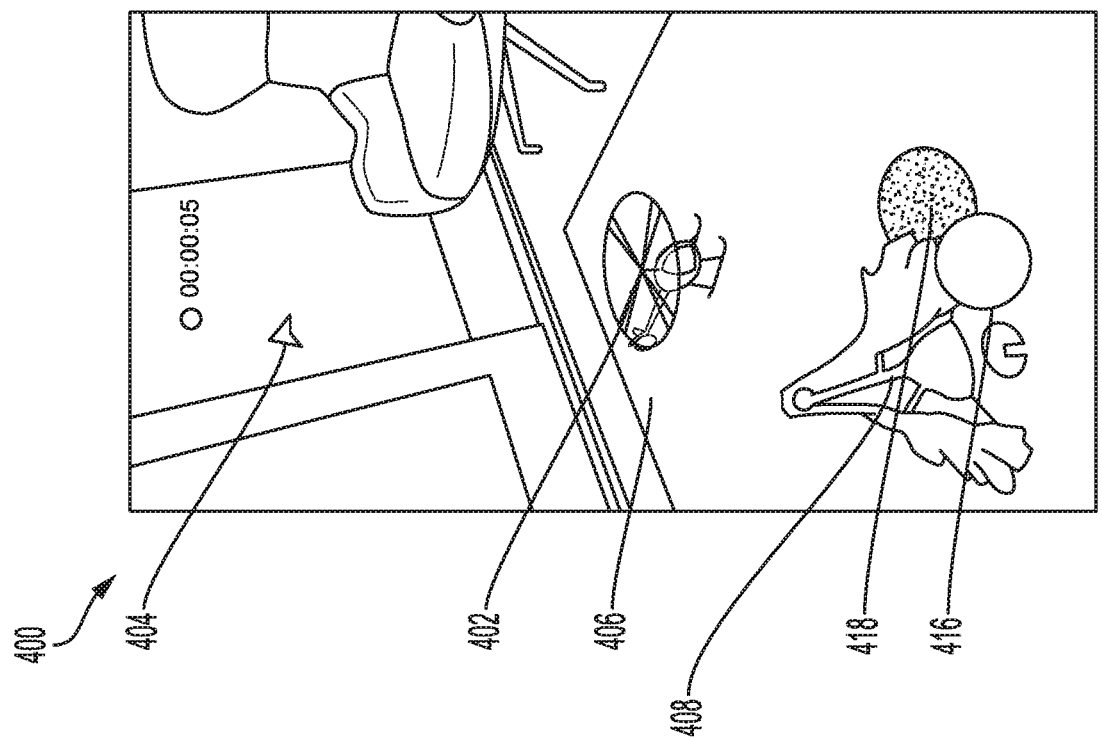

FIG. 4E depicts a mobile computing system displaying an AR scene 400 including the real-world environment and virtual objects.

In this example, FIG. 4E is an example of the mobile computing system after receiving a signal to start the animation. The AR framework produces the AR scene 400 that includes a mobile computing system orientation indicator 404. The animation generator has received additional inputs (as compared with FIG. 4D) from the user indicating a change in position or orientation of the mobile computing system. The animation generator computes a corresponding change in position or orientation of the helicopter 402. The animation generator updates the position and orientation of the helicopter 402 in the AR scene 400. FIG. 4E illustrates the helicopter 402 in a position that has been moved to the right and oriented out of the scene. FIG. 4E illustrates this by adding the chair 410 to the AR scene and modifying the appearance of the volcano 408. In FIG. 4E, the animation generator computes a position of the helicopter 402 that is above the volcano 408 in the scene. Accordingly, the animation generator computes the shadow 418 to be partially illustrated on the planar surface 406 and partially on the volcano 408.

The animation generator includes various parameters of the virtual object profile data to generate the helicopter 402. For example, the animation generator depicts the change in orientation of the helicopter by animating the right skid of helicopter 402 down (i.e., indicating a turn) towards the new orientation of the virtual object. The animation generator also includes parameters relating to the movement of the helicopter 402 such as aligning the tail rotor and nose of the helicopter 402 in accordance with the rate of change in orientation and position of the tail rotor during a change in orientation.

FIG. 4F depicts a mobile computing system displaying an AR scene 400 including the real-world environment and virtual objects.

In this example, FIG. 4E is an example of the mobile computing system after receiving a signal to stop the animation. The AR framework produces the AR scene 400 that includes a mobile computing system orientation indicator 404. The animation generator has received additional inputs (as compared with FIG. 4E) from the user indicating a change in position or orientation of the mobile computing system. The animation generator computes a corresponding change in position or orientation of the helicopter 402. The animation generator updates the position and orientation of the helicopter 402 in the AR scene 400. FIG. 4F illustrates the helicopter 402 in a position that has been moved to the right and oriented out and to the left of the scene.

The animation generator includes various parameters of the virtual object profile data to generate the helicopter 402. For example, the animation generator depicts the change in orientation of the helicopter by animating the right skid of helicopter 402 down (i.e., indicating a turn) towards the new orientation of the virtual object. The animation generator also includes parameters relating to the movement of the helicopter 402 such as aligning the tail rotor and nose of the helicopter 402 in accordance with the rate of change in orientation and position of the tail rotor during a change in orientation.

The AR framework presents second top menu bar 422A and second bottom menu bar 422B and removes the animation recording indicator from the AR scene 400 after receiving the signal to end the animation. The animation generator provides virtual object data to the AR framework that includes virtual object animation track 420. The animation generator produces virtual object animation track 420 from the recorded animation and animation data. The AR framework can display virtual object animation track 420 on planar surface 406 (i.e., the track over the planar surface 406) or at the actual position of the helicopter 402 (i.e., a height above the planar surface 406).

The animation generator includes virtual object profile data throughout the animation process. However, the animation generator also stores the raw animation data (e.g., movement tracking) so that the virtual object can be swapped during post-animation processing to produce the pre-recorded animation with a different virtual object profile. In an example, FIG. 4A-4F is illustrated with the virtual object of "helicopter." A helicopter in a real-world environment moves and changes orientation with a specific movement profile (e.g., dipping the nose to move forward, raising the nose to slow down or move backward, or changing orientation in a hover by simply rotating). However, the animation generator according to the present disclosure, enables changing the virtual object and a seamless update of the animation. Continuing with the example, changing the virtual object to "car" would update the animation to bind the virtual object to the planar surface and modify the animation to produce an animation that has typical car movement profile (e.g., wheels turn for movement, front end and rear end alignment is speed dependent, turning and acceleration is surface material variable, etc.).

Figure 5:
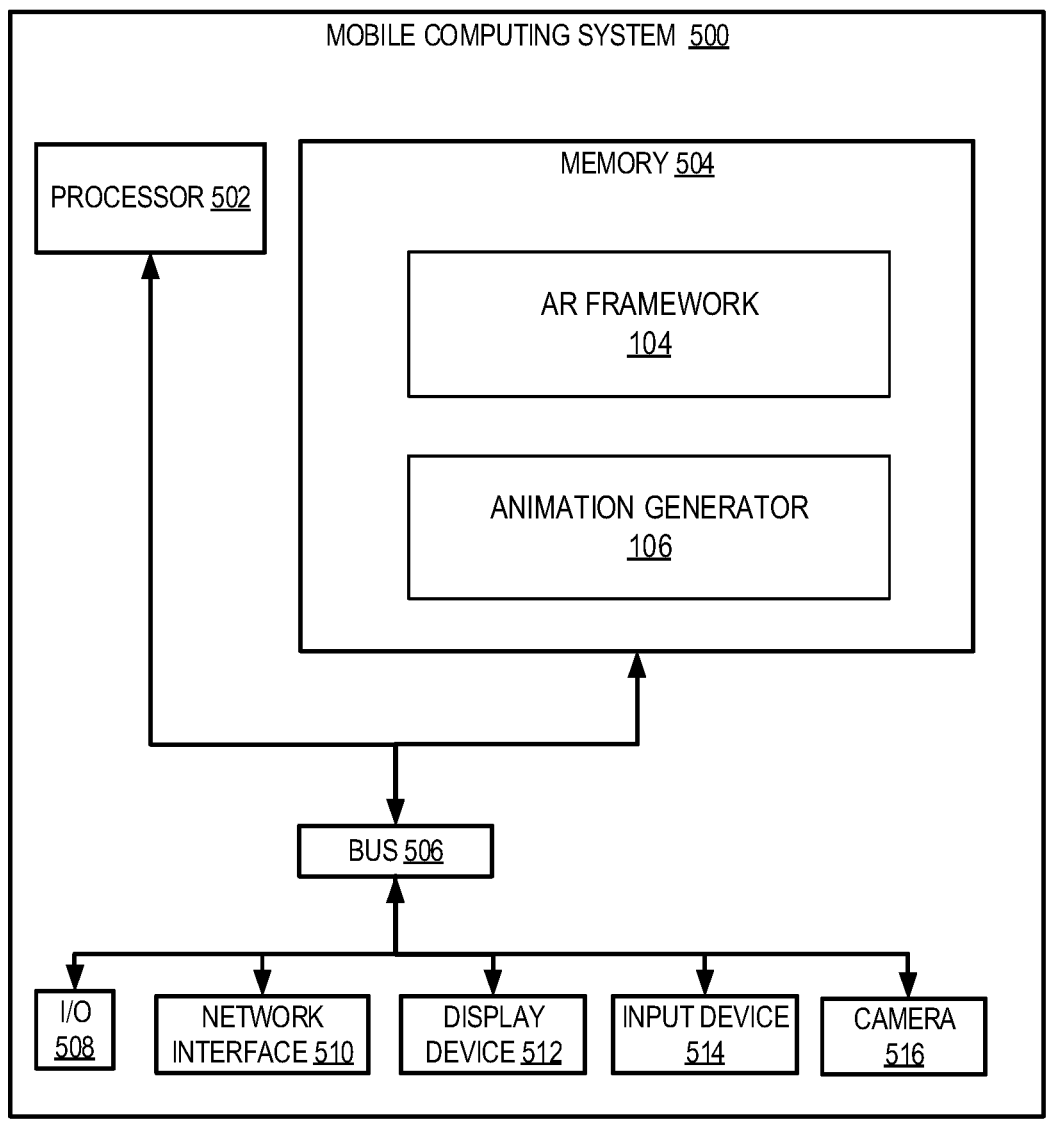
FIG. 5 depicts an example of a computing system that performs certain operations described herein, according to certain embodiments.

Any suitable computing system or group of computing systems can be used for performing the operations described herein. For example, FIG. 5 depicts examples of a mobile computing system 500 that executes an AR framework 104 and an animation generator (as described above with respect to FIGS. 1-4).

The depicted examples of a mobile computing system 500 includes a processor 502 communicatively coupled to one or more memory devices 504. The processor 502 executes computer-executable program code stored in a memory device 504, accesses information stored in the memory device 504, or both. Examples of the processor 502 include a microprocessor, an application-specific integrated circuit ("ASIC"), a field-programmable gate array ("FPGA"), or any other suitable processing device. The processor 502 can include any number of processing devices, including a single processing device.

The memory device 504 includes any suitable non-transitory computer-readable medium for storing data, program code, or both. A computer-readable medium can include any electronic, optical, magnetic, or other storage device capable of providing a processor with computer-readable instructions or other program code. Non-limiting examples of a computer-readable medium include a magnetic disk, a memory chip, a ROM, a RAM, an ASIC, optical storage, magnetic tape or other magnetic storage, or any other medium from which a processing device can read instructions. The instructions may include processor-specific instructions generated by a compiler or an interpreter from code written in any suitable computer-programming language, including, for example, C, C++, C#, Visual Basic, Java, Python, Perl, JavaScript, and ActionScript.

The mobile computing system 500 may also include a number of external or internal devices, such as input or output devices. For example, the mobile computing system 500 is shown with one or more input/output ("I/O") interfaces 508. An I/O interface 508 can receive input from input devices or provide output to output devices. One or more buses 506 are also included in the mobile computing system 500. The bus 506 communicatively couples one or more components of a respective one of the mobile computing system 500.

The mobile computing system 500 executes program code that configures the processor 502 to perform one or more of the operations described herein. The program code may correspond to the AR framework 104 and the animation generator 106 and/or other suitable applications that perform one or more operations described herein. The program code may be resident in the memory device 504 or any suitable computer-readable medium and may be executed by the processor 502 or any other suitable processor. In some embodiments, the AR framework 104 and animation generator 106 are stored in the memory device 504, as depicted in FIG. 5. In additional or alternative embodiments, one or more of the AR framework 104 and animation generator 106 are stored in different memory devices of different computing systems. In additional or alternative embodiments, the program code described above is stored in one or more other memory devices accessible via a data network.

In some embodiments, one or more of these data sets, models, and functions are stored in the same memory device (e.g., the memory device 504). For example, a device, such as the mobile computing system 100 depicted in FIG. 1, can host the AR framework 104 and animation generator 106. In additional or alternative embodiments, one or more of the programs, data sets, models, and functions described herein are stored in one or more other memory devices accessible via a data network.

The mobile computing system 500 also includes a network interface device 510. The network interface device 510 includes any device or group of devices suitable for establishing a wired or wireless data connection to one or more data networks. Non-limiting examples of the network interface device 510 include an Ethernet network adapter, a modem, and the like. The mobile computing system 500 is able to communicate with one or more other computing devices via a data network using the network interface device 510.

Figure 6:
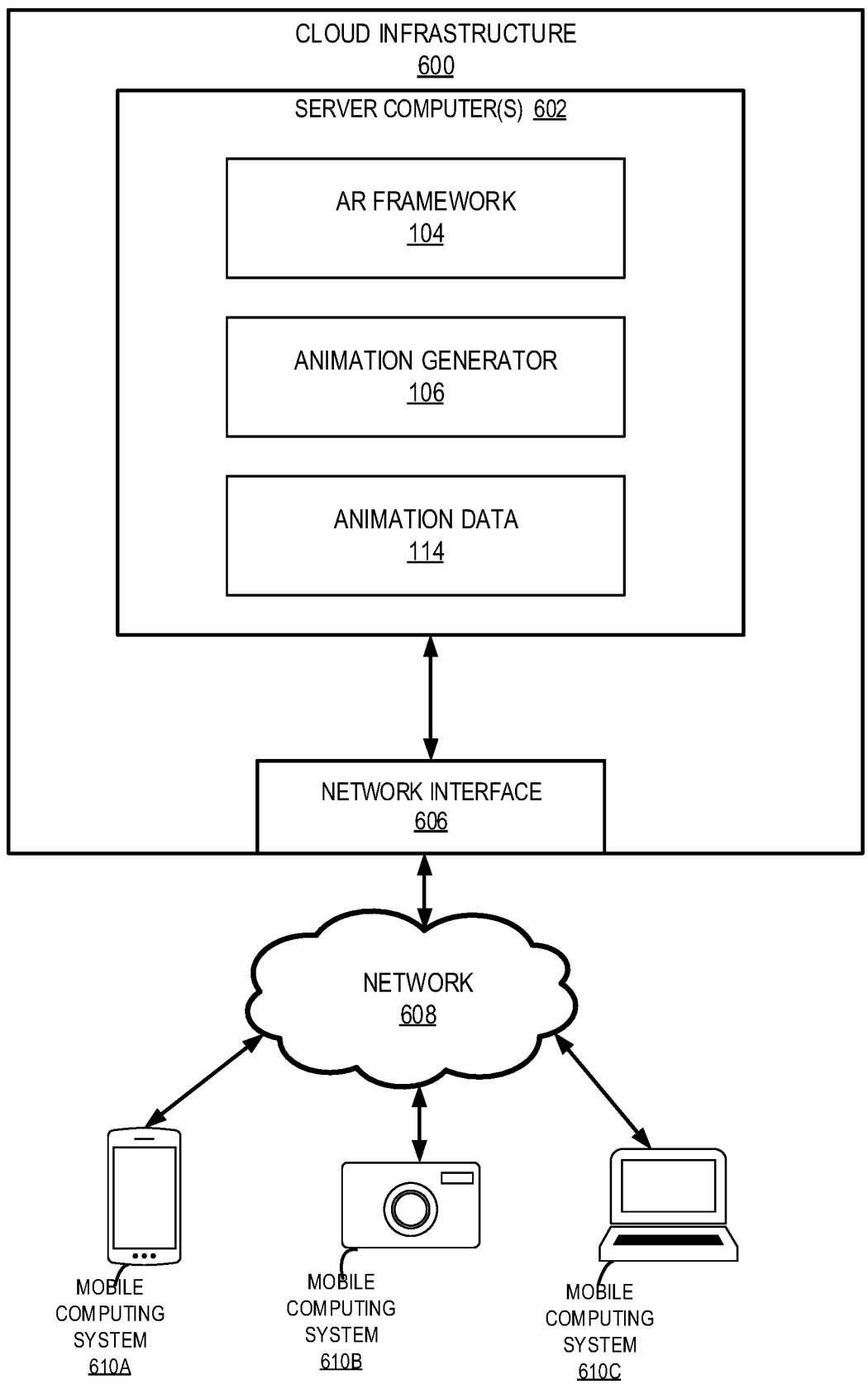
FIG. 6 depicts another example of a computing system that performs certain operations described herein, according to certain embodiments.

In some embodiments, the functionality provided by the mobile computing system 500 may be offered as a cloud service by a cloud service provider. For example, FIG. 6 depicts an example of an cloud infrastructure 600 offering one or more animation generation services that can be used by a number of user subscribers using mobile computing systems 610A, 610B, and 610C across a network 608. In certain embodiments, the animation generation services provided by the cloud infrastructure 600 include a service that generates virtual object information based on input parameters (e.g., position and orientation information) supplied by the mobile computing systems 610A, 610B, and 610C. In some cases, the amination generation services may be offered under a Software as a Service (SaaS) model. One or more users may subscribe to the animation generation services, and the cloud infrastructure 600 performs the processing to provide the animation generation services to subscribers. The Cloud infrastructure 600 may include one or more remote server computer(s) 602.

The remote server computer(s) 602 includes any suitable non-transitory computer-readable medium for storing program code (e.g., code for the AR framework 104 and animation generator 106), memory 214, or both, which is used by the cloud infrastructure 600 for providing the cloud services. A computer-readable medium can include any electronic, optical, magnetic, or other storage device capable of providing a processor with computer-readable instructions or other program code. Non-limiting examples of a computer-readable medium include a magnetic disk, a memory chip, a ROM, a RAM, an ASIC, optical storage, magnetic tape or other magnetic storage, or any other medium from which a processing device can read instructions. The instructions may include processor-specific instructions generated by a compiler or an interpreter from code written in any suitable computer-programming language, including, for example, C, C++, C#, Visual Basic, Java, Python, Perl, JavaScript, and ActionScript. In various examples, the server computer(s) 602 can include volatile memory, non-volatile memory, or a combination thereof.

One or more of the server computer(s) 602 execute the program code (e.g., via the AR framework 104 and animation generator 106) that configures one or more processors of the server computer(s) 602 to perform one or more of the operations that provide animation generation services, such as generating virtual object information and displaying an AR scene including a virtual object. Any other suitable systems or subsystems that perform one or more operations described herein (e.g., a subsystem for generating location/orientation tracking information) can also be implemented by the Cloud infrastructure 600.

In certain embodiments, the Cloud infrastructure 600 may implement the services by executing program code and/or using program data, which may be resident in a memory device of the server computer(s) 602 or any suitable computer-readable medium and may be executed by the processors of the server computer(s) 602 or any other suitable processor. In certain embodiments, the animation data 114 includes any of the data described above with respect to FIGS. 1-4. The data may be stored on the same memory device or distributed across different memory devices accessible via the network 608.

The Cloud infrastructure 600 also includes a network interface device 606 that enables communications to and from the Cloud infrastructure 600. In certain embodiments, the network interface device 606 includes any device or group of devices suitable for establishing a wired or wireless data connection to the network 608. Non-limiting examples of the network interface device 606 include an Ethernet network adapter, a modem, and/or the like. The Cloud infrastructure 600 is able to communicate with the mobile computing systems 610A, 610B, and 610C via the network 608 using the network interface device 606.

Numerous specific details are set forth herein to provide a thorough understanding of the claimed subject matter. However, those skilled in the art will understand that the claimed subject matter may be practiced without these specific details. In other instances, methods, apparatuses, or systems that would be known by one of ordinary skill have not been described in detail so as not to obscure claimed subject matter.

Unless specifically stated otherwise, it is appreciated that throughout this specification discussions utilizing terms such as "processing," "computing," "calculating," "determining," and "identifying" or the like refer to actions or processes of a computing device, such as one or more computers or a similar electronic computing device or devices, that manipulate or transform data represented as physical electronic or magnetic quantities within memories, registers, or other information storage devices, transmission devices, or display devices of the computing platform.

The system or systems discussed herein are not limited to any particular hardware architecture or configuration. A computing device can include any suitable arrangement of components that provide a result conditioned on one or more inputs. Suitable computing devices include multi-purpose microprocessor-based computer systems accessing stored software that programs or configures the computing system from a general purpose computing apparatus to a specialized computing apparatus implementing one or more embodiments of the present subject matter. Any suitable programming, scripting, or other type of language or combinations of languages may be used to implement the teachings contained herein in software to be used in programming or configuring a computing device.

Embodiments of the methods disclosed herein may be performed in the operation of such computing devices. The order of the blocks presented in the examples above can be varied—for example, blocks can be re-ordered, combined, and/or broken into sub-blocks. Certain blocks or processes can be performed in parallel.

The use of "adapted to" or "configured to" herein is meant as open and inclusive language that does not foreclose devices adapted to or configured to perform additional tasks or steps. Additionally, the use of "based on" is meant to be open and inclusive, in that a process, step, calculation, or other action "based on" one or more recited conditions or values may, in practice, be based on additional conditions or values beyond those recited. Headings, lists, and numbering included herein are for ease of explanation only and are not meant to be limiting.

While the present subject matter has been described in detail with respect to specific embodiments thereof, it will be appreciated that those skilled in the art, upon attaining an understanding of the foregoing, may readily produce alterations to, variations of, and equivalents to such embodiments. Accordingly, it should be understood that the present disclosure has been presented for purposes of example rather than limitation, and does not preclude the inclusion of such modifications, variations, and/or additions to the present subject matter as would be readily apparent to one of ordinary skill in the art.

What is claimed is:

1. A method comprising:
identifying, for a virtual object displayed in an augmented reality (AR) scene, an animation profile for animating the virtual object;
creating, based upon an initial position of the virtual object within the AR scene and an initial position of a mobile computing system in a real-world environment, a link between the virtual object and the mobile computing system, wherein the link enables, for an input position of the mobile computing system in the real-world environment, a corresponding position for the virtual object in the AR scene to be determined; and
animating the virtual object using the mobile computing system and based on the animation profile, wherein the animating comprises:
detecting a change in position in the real-world environment of the mobile computing system from a first position to a second position;

responsive to detecting the change, and using the link, determining a change in position for the virtual object in the AR scene from a first position to a second position; and updating the AR scene to display the virtual object in the second position in the AR scene.

2. The method of claim 1, wherein identifying the animation profile comprises:

selecting the animation profile from a plurality of animation profiles based upon an object type of the virtual object; and wherein the animation profile includes a set of one or more parameters that influence animation of the virtual object, the set of one or more parameters including at least one of an orientation change parameter that constrains a motion of the virtual object during an orientation change of the virtual object, a movement parameter that constrains the motion of the virtual object, an alignment parameter that constrains an alignment measured from a first end of the virtual object to a second end of the virtual object, or a planar surface interaction parameter that constrains the motion of the virtual object as it interacts with one or more planar surfaces.

3. The method of claim 1, wherein creating the link comprises:

determining a correspondence between the first position of the virtual object and the first position of the mobile computing system; and storing the correspondence between the first position of the virtual object and the first position of the mobile computing system.

4. The method of claim 3, wherein the correspondence comprises a transform equation and wherein determining the change in position for the virtual object in the AR scene from the first position to the second position comprises:

determining the second position of the mobile computing system responsive to inputs from a user indicating the change in position of the mobile computing system; and determining the second position of the virtual object using the transform equation and the second position of the mobile computing system as an input to the transform equation.

5. The method of claim 1, wherein:

detecting the change in the position of the mobile computing system comprises detecting a change in orientation of the mobile computing system from a first orientation to a second orientation;

determining the change in position for the virtual object in the AR scene comprises determining, using the link, a change in orientation of the virtual object from a first orientation to a second orientation in the AR scene; and updating the AR scene comprises displaying the virtual object in the AR scene in the second orientation.

6. The method of claim 1, wherein:

detecting the change in the position of the mobile computing system comprises detecting a change in location of the mobile computing system from a first location to a second location;

determining the change in the position for the virtual object in the AR scene comprises determining, using the link, a change in location of the virtual object from a first location to a second location in the AR scene; and updating the AR scene comprises displaying the virtual object in the AR scene in the second location.

7. The method of claim 1, wherein animating the virtual object further comprises:

displaying the AR scene via a touchscreen of the mobile computing system;

receiving a user input indicating a subsequent change in position of the virtual object in the AR scene from the second position to a third position in response to a user interaction with the touchscreen of the mobile computing system; and updating the AR scene to display the virtual object in the third position in the AR scene.

8. The method of claim 1, further comprising recording animation of the virtual object, wherein recording the animation of the virtual object comprises:

recording the change in position of the virtual object from the first position to the second position in the AR scene; and recording a movement of the virtual object from the first position to the second position.

9. The method of claim 1, wherein animating the virtual object further comprises:

receiving user input for changing the position of the virtual object, wherein the user input indicates the change in position of the mobile computing system or the user input is provided via a user-interaction with a screen displaying the AR scene; and determining the second position of the virtual object responsive to the user input.

10. The method of claim 1, wherein animating the virtual object further comprises:

identifying a planar surface closest to the virtual object; and determining a movement of the virtual object from the first position to the second position in the AR scene based on a proximity to the planar surface closest to the virtual object.

11. The method of claim 1, wherein animating the virtual object further comprises:

determining, based upon the animation profile, a movement of the virtual object in the AR scene from the first position to the second position; and displaying, in the AR scene, the movement of the virtual object from the first position to the second position in the AR scene.

12. The method of claim 11, wherein determining the movement of the virtual object from the first position to the second position in the AR scene comprises:

identifying a surface in the AR scene; and determining the movement of the virtual object from the first position to the second position in the AR scene based upon a proximity of the virtual object to the surface.

13. A mobile device comprising:

one or more processors; and a non-transitory computer-readable medium coupled to one or more processors, the non-transitory computer-readable medium storing code that when executed by the one or more processors causes the one or more processors to perform a method comprising:

identifying, for a virtual object displayed in an augmented reality (AR) scene, an animation profile for animating the virtual object;

creating, based upon an initial position of the virtual object within the AR scene and an initial position of the mobile device in a real-world environment, a link between the virtual object and the mobile device, wherein the link enables, for an input position of the mobile device in the real-world environment, a corresponding position for the virtual object in the AR scene to be determined; and animating the virtual object using the mobile device, wherein the animating comprises:

detecting a change in position in the real-world environment of the mobile device from a first position to a second position;

responsive to detecting the change, and using the link, determining a change in position for the virtual object in the AR scene from a first position to a second position; and updating the AR scene to display the virtual object in the second position in the AR scene.

14. The mobile device of claim 13, wherein identifying the animation profile comprises:

selecting the animation profile from a plurality of animation profiles based upon an object type of the virtual object; and wherein the animation profile includes a set of one or more parameters that influence animation of the virtual object, the set of one or more parameters including at least one of an orientation change parameter that constrains a motion of the virtual object during an orientation change of the virtual object, a movement parameter that constrains the motion of the virtual object, an alignment parameter that constrains an alignment measured from a first end of the virtual object to a second end of the virtual object, or a planar surface interaction parameter that constrains the motion of the virtual object as it interacts with one or more planar surfaces.

15. The mobile device of claim 13, wherein creating the link comprises:

determining a correspondence between a first position of the virtual object and the first position of the mobile device; and storing the correspondence between the first position of the virtual object and the first position of the mobile device.

16. The mobile device of claim 15, wherein the correspondence comprises a transform equation and wherein determining the change in position for the virtual object in the AR scene from the first position to the second position comprises:

determining the second position of the mobile device responsive to inputs from a user indicating the change in position of the mobile device; and determining the second position of the virtual object using the transform equation the second position of the mobile device as an input to the transform equation.

17. The mobile device of claim 13, wherein animating the virtual object further comprises:

displaying the AR scene via a touchscreen of the mobile device;

receiving a user input indicating a subsequent change in position of the virtual object in the AR scene from the second position to a third position in response to a user interaction with the touchscreen of the mobile device; and updating the AR scene to display the virtual object in the third position in the AR scene.

18. The mobile device of claim 13, wherein animating the virtual object further comprises:

identifying a planar surface closest to the virtual object; and determining a movement of the virtual object based on a proximity to the planar surface closest to the virtual object.

19. The mobile device of claim 18, wherein the movement of the virtual object is in a first manner when the virtual object is in contact with the planar surface, and wherein the movement of the virtual object is in a second manner when the virtual object is not in contact with the planar surface.

20. A non-transitory computer-readable medium having instructions stored thereon, the instructions executable by a processing device to perform operations comprising:

identifying, for a virtual object displayed in an augmented reality (AR) scene, an animation profile for animating the virtual object;

creating, based upon an initial position of the virtual object within the AR scene and an initial position of a mobile computing system in a real-world environment, a link between the virtual object and the mobile computing system, wherein the link enables, for an input position of the mobile computing system in the real-world environment, a corresponding position for the virtual object in the AR scene to be determined; and animating the virtual object using the mobile computing system, wherein the animating comprises:

detecting a change in position in the real-world environment of the mobile computing system from a first position to a second position;

responsive to detecting the change, and using the link, determining a change in position for the virtual object in the AR scene from a first position to a second position; and updating the AR scene to display the virtual object in the second position in the AR scene.

* * * * *